Nov. 13, 1951 B. E. DENTON 2,574,732

AUTOMATIC CONTROL FOR WAVE FORMS

Filed April 1, 1949 3 Sheets-Sheet 1

INVENTOR
B. Edward Denton
BY
[signature]
ATTORNEY

Nov. 13, 1951 B. E. DENTON 2,574,732

AUTOMATIC CONTROL FOR WAVE FORMS

Filed April 1, 1949 3 Sheets-Sheet 2

INVENTOR
B. Edward Denton
BY
[signature]
ATTORNEY

INVENTOR
B. Edward. Denton
BY
Clive ... Mitchell
ATTORNEY

Patented Nov. 13, 1951

2,574,732

UNITED STATES PATENT OFFICE 2,574,732

AUTOMATIC CONTROL FOR WAVE FORMS

Bethel Edward Denton, Merchantville, N. J., assignor to Radio Corporation of America, a corporation of Delaware Application April 1, 1949, Serial No. 84,836

9 Claims. (Cl. 315—27)

The present invention relates to systems for maintaining a desired wave form of a wave applied to the deflection of the cathode ray beam in a cathode ray tube, and, more particularly, but not necessarily exclusively, to novel automatic control systems which function to maintain the desired wave form of high frequency deflection wave. The system of the present invention is applicable generally to producing sinusoidal or other wave shapes, but it is especially applicable to high frequency television deflection circuits. A television deflection circuit embodying the invention will automatically provide control of the linearity of the deflection wave.

The principal object of the present invention is to obtain a wave form restoring effect in a novel manner.

Another object of the invention is to provide a novel system for employing a differential signal which is effective in accordance with the invention for maintaining the desired wave form of an output signal.

A further object of the invention is to provide a novel arrangement for automatically maintaining the wave form of the deflection wave in a reactance controlled deflection circuit associated with a cathode ray tube.

Other objects and advantages of the invention will, of course, become apparent and immediately suggest themselves to those skilled in the art to which the invention is directed from a reading of the following specification in connection with the accompanying drawings in which.

Figures 1, 2, 3, 4:
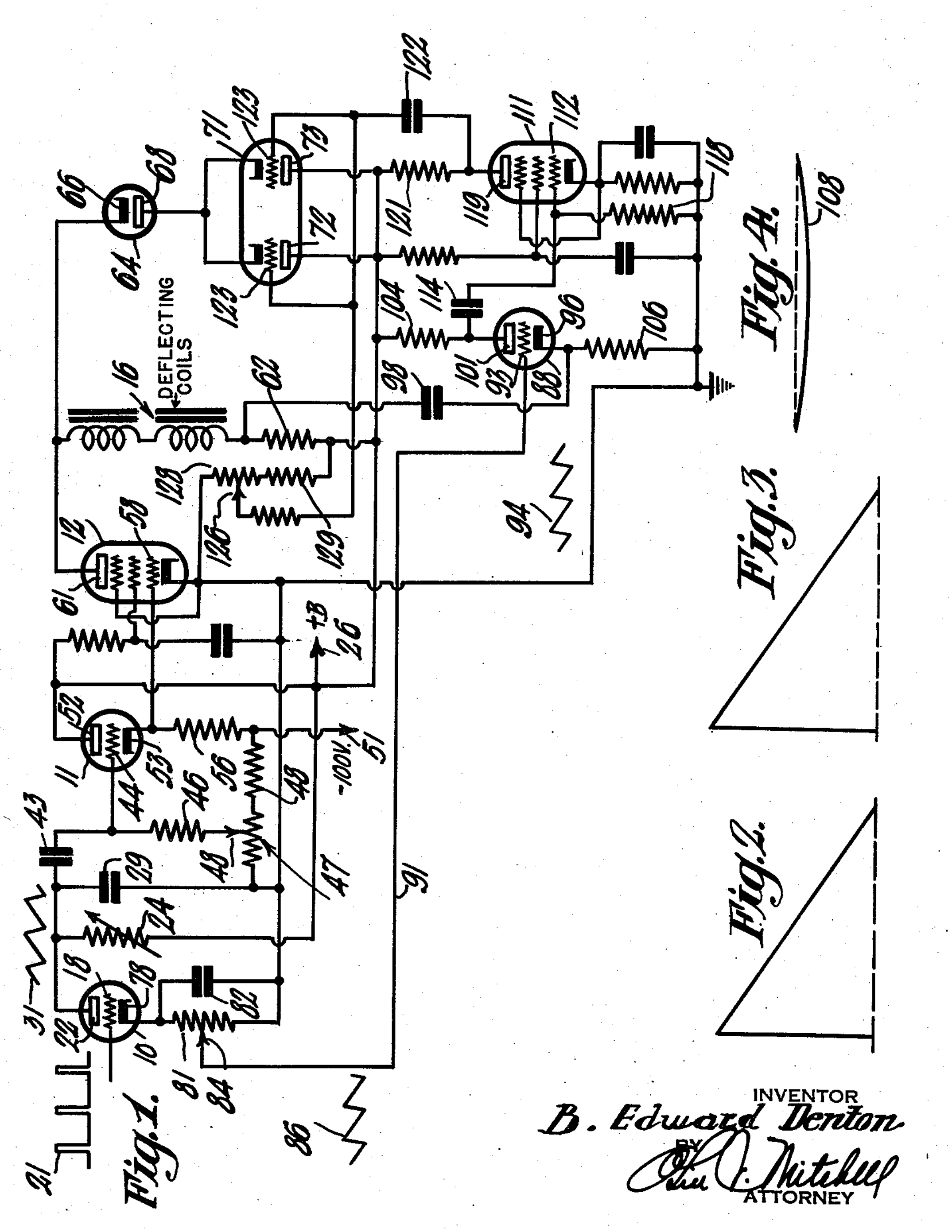
Fig. 1 shows, diagrammatically, cathode ray beam deflecting apparatus embodying the invention in one form.
Figs. 2, 3 and 4 show wave forms to be referred to hereinafter in the description of apparatus embodying the invention and, more particularly, the apparatus of Fig. 1.

Referring for the present to Fig. 1 of the drawing, there is shown, by way of example, a deflection circuit for deflecting the cathode ray beam of a cathode ray tube (not shown) along one axis, for example, the horizontal axis. Another similar deflection circuit (not shown) may be employed to produce deflection along an axis at right angles to the first axis thereby to produce a scanning raster in a well known manner. Arrangements, generally similar to that shown herein by way of example, are disclosed in Patent No. 2,101,520, granted December 7, 1937, to W. A. Tolson, and Tolson Reissue Patent No. Re. 20,338 dated April 30, 1937.

The deflection circuit selected by way of example as a convenient setting for the present invention, although the invention is not limited in use to circuits of this type, comprises a discharge tube 10, a cathode follower tube 11, a power tube 12, and deflection coils 16. The coils 16 may be incorporated in a deflection yoke for use with a cathode ray tube (neither shown).

The grid 18 of the discharge tube 10 is connected through any suitable coupling means to a source (not shown) of sharp pulses 21 of positive polarity. This source of pulses may be a blocking oscillator as shown in either of the Tolson patents mentioned above.

The anode 22 of the discharge tube 10 is connected through a charging resistor 24 to a suitable source of positive voltage (not shown) as indicated schematically at 26. The voltage supply source may be the usual B supply source generally associated with electronic equipment. Resistor 24 may be variable if desired to provide control for the deflection amplitude.

A condenser 29 is charged in series with the resistor 24 from the connection 26 and, during this period, the tube 10 is substantially biased to cut off. A sawtooth voltage will appear across the condenser 29 since this condenser is discharged periodically by the tube 10 on the occurrence of a pulse 21. The developed voltage wave is shown conventionally and is designated by reference character 31.

The voltage wave 31 developed, as a result of the operation of the tube 10, is applied through a coupling condenser 43 to the grid 44 of the cathode follower tube 11. The grid resistor 46 for the tube 11 is returned to the adjustable contact 48 of a potentiometer 47. This potentiometer may be used to adjust the operating level of the grid 44 of tube 11 and thus its cathode 53, thereby controlling the drive on element 58 of tube 12. The resistor of the potentiometer is connected in series with a second resistor 48, this series combination being connected between a negative bias source (not shown), as indicated schematically at 51 and ground. The anode 52 of the tube 11 is, or may be, directly connected to the source of positive potential indicated schematically at 26. As mentioned above, the tube 11 is connected as a cathode follower and its cathode 53 is connected to the negative potential source, as indicated at 51 through a cathode resistor 56. The control grid 58 of the power tube 12 is directly connected to the cathode 53 of the tube 11 so that the sawtooth voltage 31 is applied to the grid 58 in a positive direction from a low impedance source which permits driving control grid 58 into grid current.

The tube 12 is a power tube and is preferably a pentode, as shown, and it serves to drive a sawtooth of current through the deflection coils 16 when the voltage wave form 31 is applied to the grid 58. It will be understood that this wave form may be modified to suit the characteristics of the deflection circuit which includes the deflecting coils 16. For example, "high peaking" may be employed by including a pulse component in a well-known manner. The anode 61 of the power tube 12 is connected through the deflection coil 16 and a resistor 62 to the source of positive potential indicated at reference character 26. A diode damper tube 64 is connected effectively in series with triode 71 across the horizontal deflection coil 16 with its cathode 66 connected to the anode of tube 12 and to the coils 16. The damper tube circuit is completed from its anode 68 through the tube 71 for a purpose hereinafter to be described, and the anodes 72 and 73 of the tube are connected to the source of positive potential as indicated at 26. If the cathode of triode 71 is designed to operate with the pulse developed during retrace time the diode 64 may be omitted from the circuit. Under this condition the triode 71 performs both the functions of control and damping. A circuit employing a damper tube is disclosed in U. S. Reissue Patent No. Re. 21,400, granted March 19, 1940. A complete discussion of magnetic deflection will be found in the RCA Review for September 1947, beginning at page 506. The manner in which the tube 71 functions in accordance with the present invention to correct the wave form of the deflection will be described hereinafter in detail.

The cathode 78 of the tube 10 is returned to ground through a cathode resistor 81, which is shunted by a condenser 82. The resistor 81 serves as a potentiometer resistor, and the movable contact 84 of the potentiometer provides a connection for obtaining a sawtooth of voltage of desired amplitude indicated conventionally at 86, which is reversed in phase with respect to the sawtooth 31. A wave comparison or mixer tube 88 serves to compare this sawtooth of voltage with the sawtooth voltage which is obtained from the resistor 62 and is, therefore, an indication of the wave form of the deflection current in the deflection coils 16 so that the tube 88 will function as a wave comparison tube. The wave 86 is applied over a conductor 91 to its grid 93. The wave form of voltage shown conventionally at 94 is applied from the resistor 62 to the cathode 96 of the tube 88 by way of a coupling condenser 98. The anode 101 of the tube 88 is connected through a resistor 104 to the source of positive potential indicated schematically at 26. The cathode 96 of the tube 88 is connected to a reference point in the circuit, such as ground, through resistor 106.

The cathode of the tube 88, being in phase with the grid, allows plate current flow according to differences in the respective slope of the original or standard signal 86 and the comparison signal 94. The signal 86 and the signal 94 subtract in the plate current of the tube 88, giving rise to a differential signal 108, which is shown conventionally in Fig. 4. The signal 108 is the result of a change in plate current when there is a difference between the wave form 86 and the wave form 94. The difference signal at 101 of the tube 88 will, in general, possess a component of sawtooth in addition to the correction component.

A tube 111 receives the differential signal 108 on its signal grid 112 by way of a coupling condenser 114. A grid resistor 118 is provided for the signal grid 112. The plate 119 of the tube 111 is connected, for example, to the same source of positive high potential as is indicated at reference character 26 through a load resistor 121. The output from the tube 111 which appears across the load resistor 121 is connected by way of a coupling condenser 122 to the grids 123 of the previously mentioned tube 71. It will be understood at this point that a single tube may be used as indicated at reference character 71 having suitable characteristics. However, where large current passing capacity is required a dual tube with separate sections connected effectively in parallel, as shown, may be employed. The grids 123 of the tube 71 are connected to the slide 126 operating on a potentiometer resistor 128. The resistor 128 is connected between ground and the positive potential source indicated at 26 in series with a resistor 129. Potentiometers 84 and 126 provide means of jointly controlling the linearity of trace.

In the embodiment of Fig. 1 of the drawings, any change in current distribution through the deflection coils 16 will result in a corresponding change in the wave form 94 (also shown in Fig. 3). This will change the wave form of the developed comparison wave 108 (Fig. 4). The signal 108 is amplified by the tube 111 and is applied to the grids of the tube 71, causing the impedance of this tube to vary in such a manner as to maintain the proper voltage for linear deflection across the yoke. The diode 64 and triode 71 begins to conduct at the end of the retrace time after the resonant circuit, of which the coils 16 are a part, has executed a half cycle of what would otherwise be a decaying oscillation. The diode 64 and triode 71 will normally conduct through approximately the first half of the trace time, thus making possible control on the initial half of the trace. The extent of the automatic control on the left (or first) half of the trace is dependent on the adjustment of the circuit. The circuit must be such that these tubes will conduct throughout the trace time to be at all effective in maintaining linearity on the right (or last) half of sweep.

Figure 5:
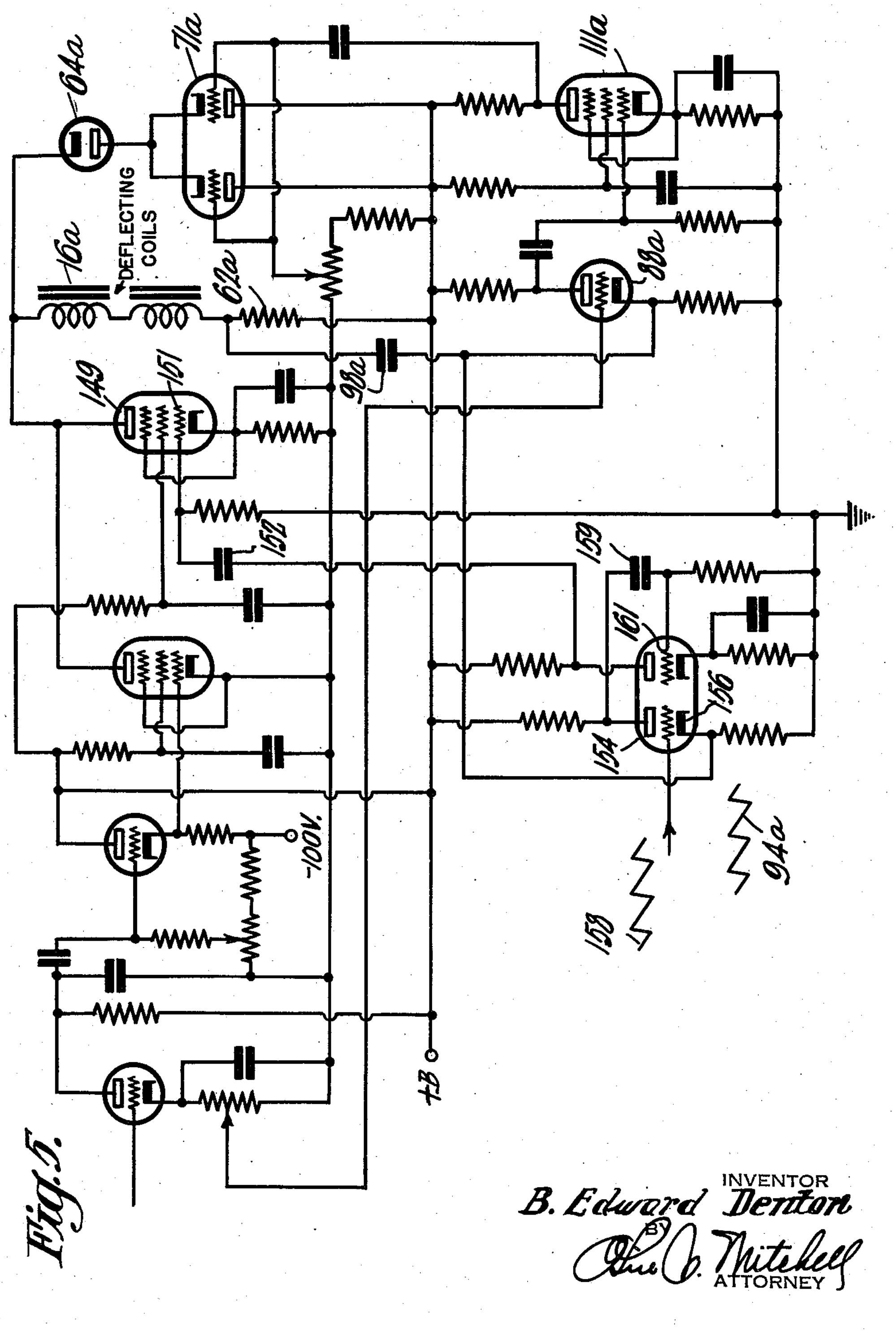
Fig. 5 is a diagrammatic showing of another embodiment of the invention.

Fig. 5 of the drawings discloses an embodiment in which complete automatic control throughout the entire trace time is obtained. In accordance with this aspect of the invention, the result is attained through the application of a dual control. The embodiment of Fig. 5 functions in the same manner as that of Fig. 1, explained above, and, in addition, a correction signal is applied in parallel with the power tube which serves as an output tube or a driver for deflection yoke current. The correction signal which is applied in parallel with the driver tube in this embodiment in the invention does not alter the initial or left-hand half of the trace as the driver or power output tube and correction tube are placed beyond cutoff during this portion of the trace.

Inasmuch as a large part of the arrangement of Fig. 5 is similar to that of Fig. 1, like components will be given the same reference characters with the suffix *a* added.

The discharge tube 10*a*, the amplifier 11*a*, and the power output or driver tube 12*a* are associated together by circuits which are the same as or similar to those shown in Fig. 1 of the drawing. The deflection coil 16*a*, diode 64*a*, and the control tube 71*a* perform in somewhat the same manner as has been explained in connection with Fig. 1 of the drawings. The control tube 71*a* operates in the manner described above under control of the mixer tube 88*a* and the amplifier tube 111a. Since the power output or driver tube 12a conducts during the latter portion of the trace, the shape of its plate current curve has a direct bearing on the latter or right-hand portion of the trace. In order that control may be exercised, a control tube 149 is connected effectively in parallel with the power or driver tube 12a. The signal grid 151 of the control tube 149 is connected by way of a coupling condenser 152 to the output from the second section of a dual triode tube 154. It will be understood that a dual type tube is shown for the sake of convenience of illustration and that separate tubes may be used. One section of this tube serves as an electronic mixer-amplifier and the other as an amplifier stage. The functions performed being very similar to those of 88 and 111 of Fig. 1 and 88a and 111a of Fig. 5. The sawtooth wave of voltage which is derived across the resistor 62a is applied through a coupling condenser 98a to the cathode 156. This sawtooth of voltage is indicated conventionally by reference character 94a. A properly formed reference sawtooth shown conventionally at 158 is derived from a suitable source (not shown) for comparison in the left-hand section of the tube 154 with wave 94a to derive a control signal which may be generally of the form shown in Fig. 4 of the drawings. This differential comparison signal is applied through a coupling condenser 159 to the grid 161 of the right-hand half of the tube 154. It is this amplified comparison signal which is applied by way of a coupling condenser 152 to the grid 151 of the tube 149.

When the wave forms 94a and 158 are identical in form, but different in amplitude, the plate current of the left-hand half of the tube 154 will change at a linear rate. If the wave form shown conventionally, as indicated by the reference character 94a, changes with respect to the wave form 158, the potential applied to the grid of the tube 149 will shift in such a way as to alter the rate of change of the conductivity of this tube thus effecting correction for the distortion. This will not alter the left-hand portion of the trace as the tubes 12 and 149 are biased beyond cutoff during this time.

Figure 6:
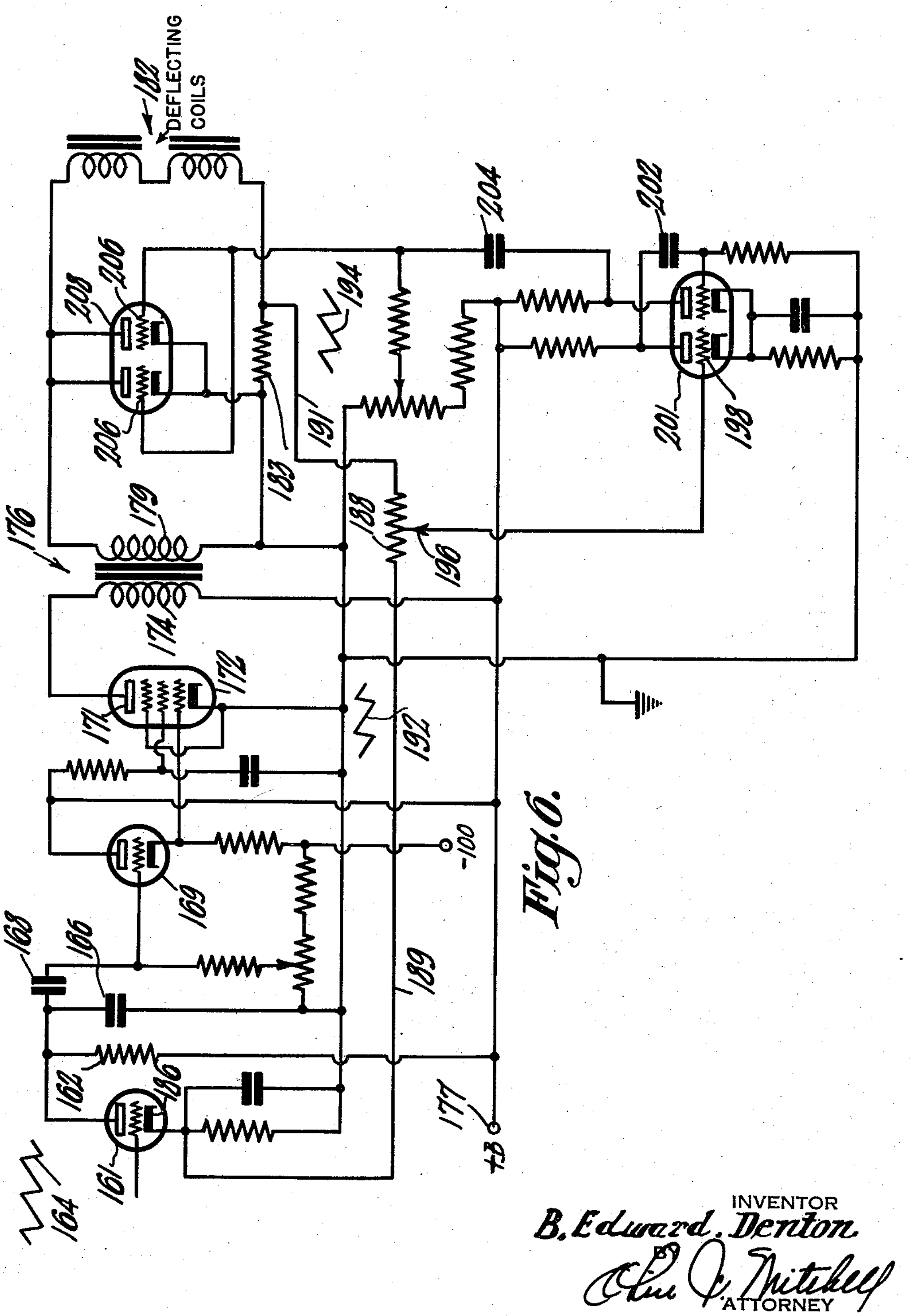
Fig. 6 is a diagrammatic showing of a further embodiment of the invention.

Fig. 6 of the drawing shows a further embodiment of the invention. Referring now to Fig. 6 of the drawing the tube 161 corresponds in function to the tube 10 of Fig. 1. This tube, the plate circuit of which includes a resistor 162 generates a sawtooth of voltage 164 by the charge and discharge cycle of a condenser 166. The sawtooth of voltage 164 is applied through a coupling condenser 168 to the grid of a tube 169 which serves as a cathode follower amplifier in the same manner as the tube 11 of Fig. 1. The anode 171 of a power output tube 172 is connected through the secondary 174 of a deflection transformer 176 to a suitable source (not shown) of positive potential as indicated schematically at 177. The secondary 179 of this transformer is connected across a set of deflection coils 182 which may be part or all of the horizontal deflecting yoke structure for a cathode ray tube. It will be understood that a centering device may be included in the deflection coil circuit as so desired. A resistor 183 is in series with the current path to the deflection coils 182 and, therefore, a voltage wave is developed across this resistor. One end of this resistor is connected to ground to provide a ground return for the control circuit to be described.

The cathode 186 of the tube 161 is connected to one end of a resistor 188 by way of a conductor 189. The remaining end of the resistor 188 is connected by way of a conductor 191 to the ungrounded end of the resistor 183. A sawtooth of voltage 192, reversed in phase with respect to the voltage wave 164, is derived from the cathode 186 from the tube 161. A sawtooth of voltage 194 reversed in phase with respect to the wave 192 is derived from the yoke current flowing through the resistor 183. If these waves 192 and 194 are similar and equal, the potential at some point along a resistor, for example at its electrical center, will remain substantially fixed. The resistor 188 serves as a potentiometer and the potentiometer slider 196 is connected to the grid 198 of the one section of the dual tube 201. If the wave form shown conventionally is indicated by the reference character 194, change with respect to the wave form 192, appearing at the cathode 186 of the tube 161, the potential applied to the grid 198 of the left-hand tube section 201 will be changed. The potentiometer 196 may, therefore, be used to change the amplitude of the signal reaching the grid 198 of 201 and thus serve as a linearity control.

The right hand section of the tube 201 amplifies potential differences arising as a result of the comparison wave shape 194 at the wave shape 192, coupling between the tube sections being accomplished by coupling condenser 202. The output from the right-hand section of the tube 201 is connected through a coupling condenser 204 to the grids 206 of the tube 208. The tube 208 serves as a damper tube which starts to conduct at the end of the retrace time. The current flowing through this tube at the beginning of trace is the result of energy stirred in the yoke and transformed at the end of retrace. The current flowing through the tube and yoke bear a definite relation. Thus by controlling the current flowing through 208 by the application of a control signal to its grid, control of linearity of the left-hand side of the screen is achieved. This current has the desired corrected sawtooth wave shape with correct linearity.

What is claimed is:

1. A system for maintaining a desired wave form comprising an electric wave source, utilization apparatus operating under control of said wave, an electronic tube having at least a cathode, an anode and a control electrode, an anode circuit for said anode, means for coupling said anode circuit to said utilization device, a wave comparison device, means for applying an electric wave from a source of waves of standard wave form to said comparison device, means for applying a wave from said utilization apparatus to said comparison device effectively in opposite phase relationship to the wave applied from said wave source, said comparison device having means for deriving a differential effect, means for applying said differential effect to the anode circuit of said tube, a branch circuit for said utilization apparatus, a second wave comparison device, means for applying an electric wave from said source to said second comparison device, means for applying a wave from said utilization circuit to said second comparison device in opposite phase relationship to the wave applied from said wave source, said second comparison device having means for deriving a differental effect, and means for applying said differential effect to said branch circuit.

2. A deflection system for deflecting the cathode ray beam of a cathode ray tube comprising a sawtooth wave generator, a deflection coil, a damper tube for said coil, a driver tube controlled by said generator for driving a beam deflecting current through said coil, means for coupling said tube to said coil, a wave comparison device comprising electronic tube means, a pair of electrodes associated with said tube means, each electrode being effective to control current flow through said tube means, means for applying an electric wave from said sawtooth wave generator to one of said electrodes, means for obtaining a voltage wave representation of the current wave in said coil, means for applying the obtained voltage wave to the other of said electrodes, said comparison device having means for supplying a differential effect, and means for applying said differential effect to said damper tube.

3. A deflection system for deflecting the cathode ray beam of a cathode ray tube comprising a sawtooth wave generator, a deflection coil, a control tube in the deflection coil circuit, a driver tube controlled by said generator for driving a beam deflecting current through said coil, means for coupling said tube to said coil, a wave comparison device comprising an electronic tube, a control electrode for said tube, means including a resistor for applying an electric wave from said sawtooth wave generator to said control electrode, a connection from said coil to said resistor for applying a voltage wave representing the current wave in said coil to said control electrode in opposite phase relationship to the wave applied from said wave generator, said comparison device having means for supplying a differential effect, and means for applying said differential effect to said control tube.

4. A deflection system for deflecting the cathode ray beam of a cathode ray tube comprising a sawtooth wave generator, a deflection coil, a driver tube controlled by said generator for driving a beam deflecting current through said coil, means for coupling the output circuit of said tube to said coil, a control damper tube having a control electrode connected across said coil, a wave comparison device comprising an electronic tube, a control electrode for said tube, means including a resistor for applying an electric wave from said sawtooth wave generator to said control electrode, a connection from said coil to said resistor for applying a voltage wave representing the current wave in said coil to said control electrode in opposite phase relationship to the wave applied from said wave generator, said comparison device having means for supplying a differential effect, and a connection to the control electrode of said damper control tube from said wave comparison device.

5. A system for maintaining a desired wave form comprising an electric wave source, a utilization circuit for said wave, a control circuit for said utilization circuit comprising a tube effectively in parallel with said utilization circuit, a wave comparison device, means for applying an electric wave from said wave source to said comparison device, means for applying a wave from said utilization circuit to said comparison device in the same phase relationship to the wave applied from said wave source, said comparison device having means for deriving a differential effect, and means for applying said differential effect to the tube in said control circuit to offset a departure in the wave form appearing in said utilization device from the wave form supplied by said electric wave source.

6. The system of claim 5 wherein said control circuit also comprises a unilaterally conducting device in series with said tube.

7. A system for maintaining a desired wave form comprising an electric wave source, an inductive utilization circuit comprising a highly inductive coil for said wave comprising a damper circuit for said coil comprising a tube having a control electrode, a wave comparison device, means for applying an electric wave from said wave source to said comparison device, means for applying a wave from said utilization circuit to said comparison device effectively in opposite phase relationship to the wave applied from said wave source, said comparison device having means for deriving a differential effect, and means for applying said differential effect to the control electrode of said tube to offset a departure in the wave form appearing in said utilization device from the wave form supplied by said electric wave source.

8. A deflection system for deflecting the cathode ray beam of a cathode ray tube comprising a sawtooth wave generator, a deflection coil, a driver tube controlled by said generator for driving a beam deflecting current through said coil, a transformer coupling said deflection coil to said driver tube, a damper tube for said coil, a wave comparison device comprising electronic tube means having a control electrode, means for applying an electric wave from said sawtooth wave generator to one end of a resistor, means for obtaining a voltage wave representation of the the current wave in said coil, means for applying the obtained voltage wave to the other end of said resistor, a connection from a point on said resistor to said control electrode, and means for coupling said electronic tube means to said damper tube.

9. A deflection system for deflecting the cathode ray beam of a cathode ray tube comprising a sawtooth wave generator, a deflection coil, a damper tube for said coil, a driver tube for driving a beam deflecting current through said coil, a cathode follower amplifier for coupling said sawtooth wave generator to said driver tube, means for coupling said tube to said coil, a wave comparison device comprising electronic tube means, a pair of electrodes associated with said tube means, each electrode being effective to control current flow through said tube means, means for applying an electric wave from said sawtooth wave generator to one of said electrodes, means for obtaining a voltage wave representation of the current wave in said coil, means for applying the obtained voltage wave to the other of said electrodes, and comparison device having means for supplying a differential effect, and means for applying said differential effect to said damper tube.

B. EDWARD DENTON.

REFERENCES CITED

The following references are of record in the file of this patent:

UNITED STATES PATENTS

| Number | Name | Date |
|---|---|---|
| 2,280,733 | Tolson | Apr. 21, 1942 |
| 2,280,990 | White | Apr. 28, 1942 |
| 2,440,786 | Schade | May 4, 1948 |
| 2,466,537 | De Vore | Apr. 5, 1949 |